(12) United States Patent
Yermakov (10) Patent No.: US 10,356,115 B2
(45) Date of Patent: Jul. 16, 2019

(54) CREATING AGGREGATE NETWORK FLOW TIME SERIES IN NETWORK ANOMALY DETECTION SYSTEMS

(71) Applicant: Level 3 Communications, LLC, Broomfield, CO (US)

(72) Inventor: Sergey Yermakov, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 181 days.

(21) Appl. No.: 15/475,743

(22) Filed: Mar. 31, 2017

(65) Prior Publication Data
US 2018/0288081 A1    Oct. 4, 2018

(51) Int. Cl.
| G06N 5/04 | (2006.01) |
| H04L 29/06 | (2006.01) |
| H04L 12/26 | (2006.01) |
| H04L 12/24 | (2006.01) |

(52) U.S. Cl.
CPC .......... *H04L 63/1425* (2013.01); *G06N 5/04* (2013.01); *H04L 41/142* (2013.01); *H04L 43/062* (2013.01); *H04L 63/1458* (2013.01)

(58) Field of Classification Search
CPC ............. H04L 63/1425; H04L 43/062; H04L 63/1458; G06N 5/04
USPC .......................................................... 726/23
See application file for complete search history.

(56) References Cited

U.S. PATENT DOCUMENTS

| 7,376,080 | B1* | 5/2008 | Riddle | H04L 43/0882 370/229 |
| 2007/0180526 | A1* | 8/2007 | Copeland, III | H04L 63/1416 726/23 |
| 2010/0085891 | A1* | 4/2010 | Kind | H04L 43/026 370/253 |
| 2010/0257133 | A1* | 10/2010 | Crowe | G06Q 10/10 706/58 |
| 2012/0079101 | A1* | 3/2012 | Muppala | H04L 63/0236 709/224 |
| 2013/0041934 | A1* | 2/2013 | Annamalaisami | H04L 43/026 709/203 |
| 2013/0347103 | A1* | 12/2013 | Veteikis | H04L 43/04 726/22 |
| 2015/0023170 | A1* | 1/2015 | Kakadia | H04L 41/0823 370/235 |
| 2016/0219067 | A1* | 7/2016 | Han, II | H04L 63/1425 |
| 2017/0317899 | A1* | 11/2017 | Taylor | H04L 43/062 |
| 2018/0227176 | A1* | 8/2018 | Ponnuswamy | H04L 41/0816 |

* cited by examiner

*Primary Examiner* — Farid Homayounmehr
*Assistant Examiner* — Thanh T Le (57) ABSTRACT

In an embodiment, a computer implemented method receives flow data for one or more flows that correspond to a device-circuit pair. The method calculates a time difference for each flow that corresponds to a device-circuit pair. Based on the calculated time differences and the received flow data, the method updates a probability distribution model associated with the device-circuit pair. Then, the method determines whether a time bucket is complete or open based on the updated probability distribution model.

16 Claims, 4 Drawing Sheets

CREATING AGGREGATE NETWORK FLOW TIME SERIES IN NETWORK ANOMALY DETECTION SYSTEMS

BACKGROUND

Technical Field

This field generally relates to monitoring network activities. More specifically, embodiments relate to network anomaly detection.

Background

A communication network may, for example, provide a network connection that allows data to be transferred between two geographically remote locations. A network may include network elements connected by links. The network elements may be any type of managed device on the network, including routers, access servers, switches, bridges, hubs, IP telephones, IP video cameras, computer hosts, and printers. Network elements can be physical or logical and can communicate with one another via interconnected links.

Network anomalies in a communication network may occur for various reasons. For example, the number of network flows created by an individual user may appear usually high on a network device. Such high number of network flows could be an indication that the user has initiated a denial-of-service (DOS) attack.

SUMMARY

In an embodiment, a computer implemented method receives flow data for one or more flows that correspond to a device-circuit pair. The method calculates a time difference for each flow that corresponds to a device-circuit pair. Based on the calculated time differences and the received flow data, the method updates a probability distribution model associated with the device-circuit pair. Then, the method determines whether a time bucket is complete or open based on the updated probability distribution model.

System and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Generally, the left-most digit(s) of a reference number identifies the drawing in which the reference number first appears.

DETAILED DESCRIPTION

Network anomaly detection (AD) systems monitor networks for unusual events or trends. Some network anomaly detection systems rely on network flow data (e.g., netflow data) to detect anomalies. These detection systems have to take into account that network flow records, such as netflow records, collected from network devices are controlled by timeout settings (or their default values) on the network devices. For a network anomaly detection system to start processing network flow data for a specific time period (i.e., a time bucket), the AD system usually introduces a time delay after which the AD system can assume that the time bucket is complete and that the AD system does not expect further network flow data for the time bucket.

Choosing a timeout delay value can become a complicated and difficult task. If the AD system uses a single timeout delay value for the whole monitored network (e.g., the longest timeout value of all the monitored network devices), the AD system could start lagging in detecting network anomalies. For example, if a network contains many network devices, but only a few devices have the longest timeout value, then using the single longest timeout value would unnecessarily delay the processing of network flow data for the rest of network devices of the network.

On the other hand, maintaining different timeout delay values for each network device of the network has its own drawbacks. Keeping track of individual timeout delay values for many devices can be complex and does not add much improvement to a detection system's responsiveness.

Additional factors that could complicate uniform creation of network flow time series: (1) network flow is configured on each device and includes network flow version, timeout settings (or their defaults); (2) human configuration could lead to configuration errors; (3) different network device vendors have different network flow implementations; and (4) network flow data patterns can vary.

Accordingly, there is a need for determination of appropriate timeout delay values that addresses the above problems so that AD systems can process the network flow data more efficiently and more effectively.

To overcome the problems of the conventional systems discussed above, embodiments utilize statistical approaches and treat network flow records as probability events. AD systems do not have to analyze every single piece of flow data to detect network anomalies because a certain amount of trailing flow data may be statistically insignificant for the AD systems to detect anomalies. Determination of when some trailing flow data becomes statistically insignificant depends on the flow patterns. Embodiments here may maintain statistical values, such as standard deviation, mean, variance, and skewness, and use these values to determine appropriate timeout delay values. In this way, the determined timeout delay values can properly address different network flow patterns.

Figure 1:
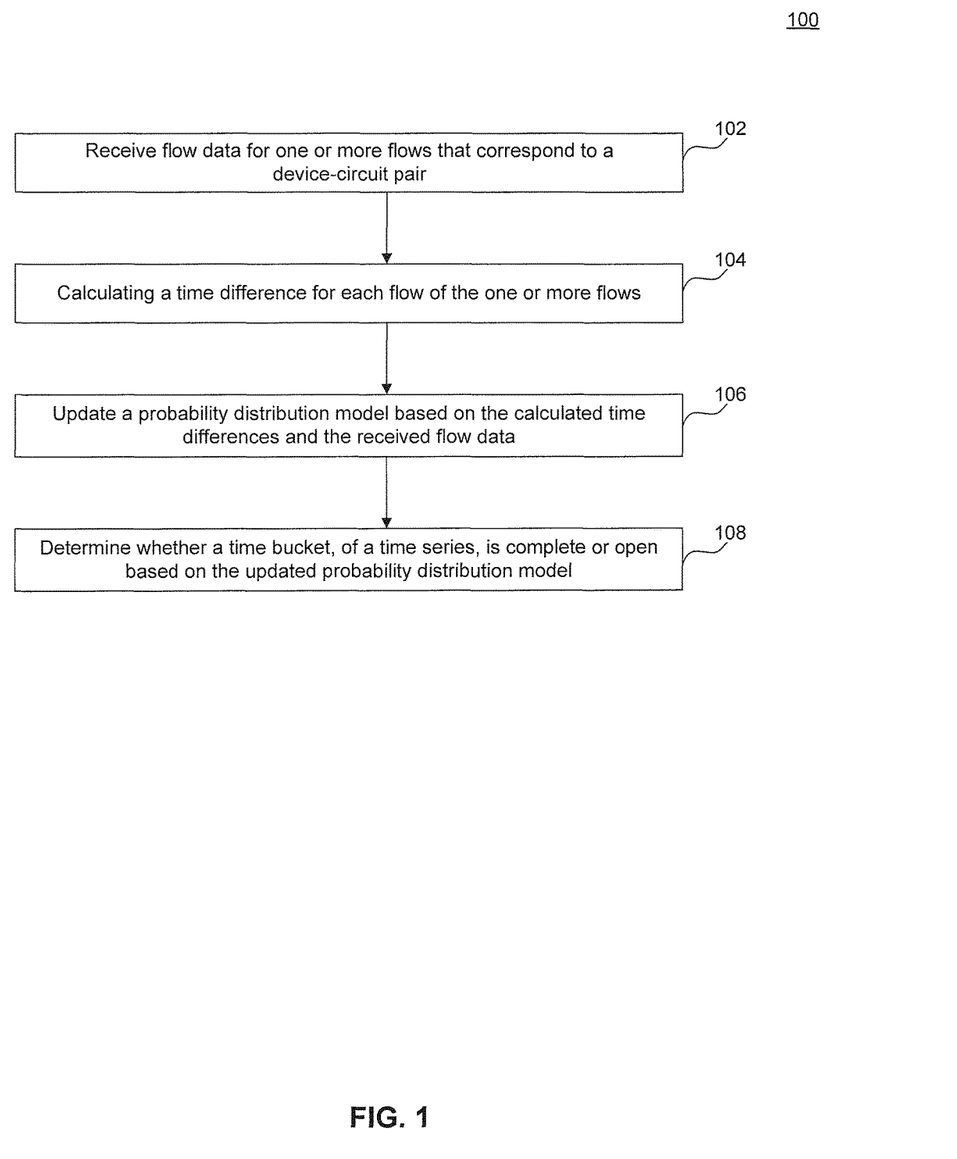
FIG. 1 a flowchart illustrating an exemplary method for processing network flow data over a time series associated with a device-circuit pair, according to one embodiment.

FIG. 1 is a flowchart illustrating a method 100 for processing network flow data over a time series associated with a device-circuit pair. Network flow data can be netflow data in some embodiments. Network flow data can also be any other types of data that captures characteristics of network flows. A time series is a series of time buckets (i.e., time periods) with corresponding network flow data. Method 100 may be performed by a time series module, such as time series module 406 described in FIG. 4.

Method 100 begins at step 102 where the time series module receives flow data for one or more flows that correspond to a device-circuit pair. The time series module may receive a network flow record (e.g., netflow record) containing flow data. A network flow record may contain data related to one or more network flows. For example, the time series module may receive a network flow record from one or more flow collector servers that collect network flow data from network devices. Network flow data, as the term is used herein, is not limited to data from a particular brand or type of router. The network flow data may include a record for each data flow. Each data flow may be one or more packets in time proximity with one another having a common protocol identified via Internet Protocol (IP) addresses and Transport Control Protocol (TCP) or User Datagram Protocol (UDP) ports. When a certain amount of time passes after receipt of a packet having these characteristics, the network device determines that the flow has ended, and if the network device receives any additional packets with these characteristics, the network device regards the packets as belonging to a new data flow and represents them with a new network flow data record. Each network flow record, such as a netflow record, may include, but is not limited to, the data flow's (1) source and destination IP addresses, (2) source port number and destination port number, (3) type of layer 3 protocol (e.g., TCP or UDP), (4) start and end times, (5) size (e.g., number of bytes), and (6) input logical interface (ifIndex). The last field, input logical interface, is also called a circuit, which can be used to identify a user (e.g., a subscriber to the network services provided by a service provider). Network flow data collection functionality may be configured on a per-interface basis on a network device. For instance, for some versions of Cisco routers, the ip flow ingress command can be used to enable netflow on an interface. The ip flow-export destination <address> <port> command may be used to configure where the netflow data is exported.

In this way, network flow data summarizes certain characteristics of a data flow. Each flow record is created by identifying packets with similar flow characteristics and counting or tracking the packets and bytes per flow. The flow details or caches information is exported to a flow collector server periodically based upon flow timers. Expired flows may be grouped together into datagrams, such as "netflow export" datagrams, for export.

From the received network flow record, the time series module may identify flow data for one or more flows that correspond to the device-circuit pair. As described above, a circuit (i.e., input logical interface) can be used to identify a user. Further, when the time series module receives a network flow record that a network device exports to a collector server, the time series module can identify the network device that exports the network flow record. In this way, the time series module may determine a device-circuit pair that corresponds to a user for a network device.

At step 104, the time series module calculates a time difference for each flow of the one or more flows that correspond to the device-circuit pair. For example, if a network flow record contains flow data for two device-circuit pairs, the first pair including 10 flows, and the second pair including 20 flows, the time series module would calculate 10 time differences for the first device-circuit pair, and calculate 20 time differences for the second device-circuit pair.

In one embodiment, the time series module may calculate the time difference for a flow based on the start time of the flow and the current time (e.g., the start time of the flow minus the current time). In another embodiment, the time series module may calculate the time difference for a flow based on the end time of the flow and the current time (e.g., the end time of the flow minus the current time). In yet another embodiment, the time series module may calculate the time difference for a flow based on a combination of the time differences described in the first two embodiments. In some embodiments, the time series module may use the file stamp time of a received network flow record as the current time.

At step 108, the time series module updates a probability distribution model based on the calculated time differences and the received flow data. In some embodiments, a probability distribution model is associated with a device-circuit pair. A probability distribution model may include flow data that corresponds to the device-circuit pair, and time differences for flows that correspond to the device-circuit pair. For example, a probability distribution model may have time differences in one dimension (e.g., X-axis) and flow data in another dimension (e.g., Y-axis). The flow data in the probability distribution model may be one or more types of data in the network flow records described above. In one embodiment, the time series module may use the number of flows as the flow data (e.g., Y-axis) in the probability distribution model.

In other embodiments, the time series module may use other types of data (e.g., the number of bytes) in the network flow records as the flow data in the probability distribution model. The probability distribution model may also maintain one or more statistical values such as, a mean value, a standard deviation value, a variance value, and/or a skewness value. The time series module may calculate the statistical values (the mean value, the standard deviation value, the variance value, and/or the skewness value) from the time differences and the flow data of the probability distribution model.

In some embodiments, to update the probability distribution model, the time series module incorporates the received flow data from the received network flow record and the calculated time differences into the probability distribution model. For illustration purpose, assume that the probability distribution model has the number of flows as the flow data on the Y-axis. Also for illustration purpose, assume the received network flow record contains data for 100 flows with a calculated time difference value of 0 second, and 200 flows with a calculated time difference value of 2 seconds. The time series module would update the probability distribution model by incrementing the number of flows by 100 that corresponds to time difference at 0 second and incrementing the number of flows by 200 that corresponds to time difference at 2 seconds.

The incorporation of the new data in the probability distribution model could impact the statistical values (e.g., the mean value and the standard deviation value) for the probability distribution model. Thus, after the incorporation of the received flow data from the received network flow record and the calculated time differences into the probability distribution model, the time series module can update the statistical values. For example, the time series module can update the mean value by calculating the mean value based on the time differences and the flow data included in the updated probability distribution model. The time series module can also update the standard deviation value by calculating the standard deviation value based the time differences and the flow data included in the probability distribution model.

As described above, the time series module may calculate a time difference with respect to the start time of a flow. Thus, in one embodiment, the time series module may calculate the mean value and the standard deviation value with respect to the start times of the flows in the probability distribution model. The time series module may also calculate a time difference with respect to the end time of a flow. Thus, in another embodiment, the time series module may calculate the mean value and the standard deviation value with respect to the end times of the flows in the probability distribution model. In a third embodiment, the time series module may calculate the mean value and the standard deviation value with respect to a combination of the start times and the end times of the flows in the probability distribution model. In yet another embodiment, the probability distribution model may maintain the flow data with respect to multiple types of time differences (e.g., one with respect to the start times of the flows and another with respect to the end times of the flows). Accordingly, the time series module may calculate multiple sets of mean values and standard deviation values (e.g., one set with respect to the start times of the flows and another set with respect to the end times of the flows) for a probability distribution model.

At step 108, the time series module determines whether a time bucket, of the time series, is complete or open based on the updated probability distribution model. When the time bucket is determined to be complete, the time series module would ignore further flow data that corresponds to the time bucket. For a completed time bucket, even if there is further flow data for this time bucket afterwards, the further flow data would be statistically insignificant to impact the network anomaly analysis. Thus, in some embodiments, when the time series module determines a time bucket to be complete, the time series module would send the flow data corresponding to the time bucket to a detection module so that the detection module could process and analyze the flow data, and detect possible network anomalies based on the analysis. On the other hand, when a time bucket is determined open (i.e., not complete), the time series module would continue to incorporate further network flow data for the corresponding time bucket.

To determine whether a time bucket is complete, the time series module may first calculate a time delay value for the device-circuit pair based on data from the probability distribution model associated with the device-circuit pair. For example, the time series module may calculate the time delay value based on the standard deviation value described above. In another example, the time series module may calculate the time delay value based on the standard deviation value and the mean value described above. For instance, the time series module may calculate the time delay value to be [2×(standard deviation value)−(mean value)]. In various embodiments, the time series module may calculate a time delay value based on one or more of the statistical values (e.g., mean, standard deviation, variance, and skewness) from the probability distribution model.

As described above, the time differences in the probability distribution model can be calculated with respect to the start times of the flows, or the end times of the flows. Thus, in one embodiment, the time series module may calculate the time delay value based on the standard deviation value and the mean value with respect to the start times of the flows. In another embodiment, the time series module may calculate the time delay value based on the standard deviation value and the mean value with respect to the end times of the flows. In yet another embodiment, the time series module may calculate the time delay value based on multiple sets of standard deviation values and the mean values (e.g., one set with respect to the start times of the flows, and another set with respect to the end times of the flows).

After the time series module determines the time delay value for the time series associated with a device-circuit pair, the time series module may add the time delay value to the end time of a time bucket to create an expiry time for the time bucket. If the current time is beyond the expiry time for the time bucket, the time series module would determine that the time bucket is complete. Otherwise, the time bucket is determined to be open (i.e., not complete).

As described above, in some embodiments, the time series module may utilize the file stamp time of the received network flow record as the current time. Thus, using a simple example for illustration purpose, assume the file stamp time of the received network flow record is 8:06 pm and the calculated time delay value is +5 minutes. For a time bucket starting at 7:50 pm and ending at 8:00 pm, the time series module would add the time delay value (+5 minutes) to the end time (8:00 pm) to create an expiry time (8:05 pm) for the time bucket. Because the file stamp time (8:06 pm) is beyond the expiry time (8:05 pm), the time series module would determine that the time bucket is complete (i.e., the time bucket is closed for update). That means, the time series module would ignore further flow data corresponding the time bucket starting at 7:50 pm and ending at 8:00 pm.

On the other hand, for a second time bucket starting at 8:00 pm and ending at 8:10 pm, the time series module would also add the time delay value (+5 minutes) to the end time (8:10 pm) to create an expiry time (8:15 pm) for the second time bucket. Because the file stamp time (8:06 pm) is not beyond the expiry time (8:15 pm) for the second time bucket, the time series module would determine that the second time bucket is open. That means, the time series module would continue to take further flow data corresponding the second time bucket.

Figure 2:
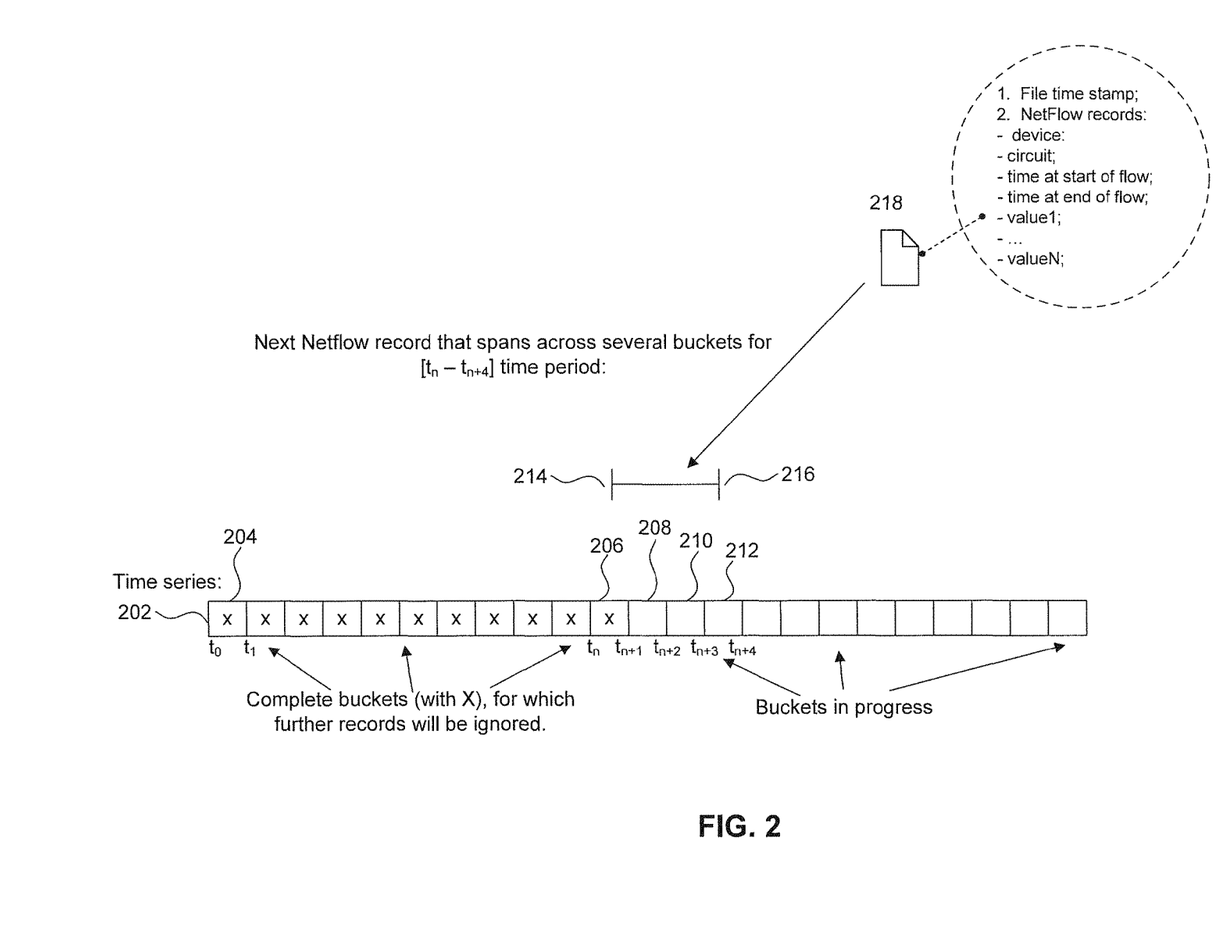
FIG. 2 provides an exemplary illustration of a time series and how a received network flow record could impact flow data update for the time series.

FIG. 2 provides an exemplary illustration of a time series associated with a device-circuit pair. FIG. 2 also depicts how a received network flow record could impact flow data update for the time series. In some embodiments, one time series is created for one device-circuit pair. Time series 202 includes a series of time buckets corresponding to a device-circuit pair. A time bucket is a time period associated with corresponding flow data. Each time bucket has a start time and an end time. For example, time bucket 204 covers a time period from $t_0$ to $t_1$. Similarly, time buckets 206, 208, 210, and 212 cover time periods from $t_n$ to $t_{n+1}$, from $t_{n+1}$ to $t_{n+2}$, $t_{n+2}$ to $t_{n+3}$, and $t_{n+3}$ to $t_{n+4}$, respectively. Also in FIG. 2, a time bucket marked with an "X" denotes that the time bucket is complete. For example, time bucket 204 is complete, and this bucket is marked with an "X."

The time series module may receive network flow records, such as netflow records, from one or more collector servers. For example, after the time series module receives network flow record 218, the time series module identifies flow data for flows that correspond to the device-circuit pair. For the received flow data, the time series module determines a time period covered by the received flow data. For instance, vertical time bar 214 represents the first recorded time for the received flow data. Vertical time bar 216 represents the last recorded time for the received flow data. Accordingly, the time period from vertical time bar 214 to vertical time bar 216 represents a time period covered by the received flow data, contained in network flow record 218, for one or more flows that correspond to the device-circuit pair.

As FIG. 2 shows, the time period from vertical time bar 214 to vertical time bar 216 spans across four time buckets: 206, 208, 210, and 212. The time series module may determine whether to update each of these four time buckets. As described above with respect to Method 100, the time series module determines a time delay value ($t_A$) from the probability distribution model (not shown in FIG. 2) corresponding to time series. The time series module then determines whether each time bucket is complete. For example, for time bucket 206, the time series module would add the time delay value ($t_A$) to the end time ($t_{n+1}$) of time bucket 206 to calculate an expiry time ($t_{n+1}+t_A$). In the example shown in FIG. 2, if the current time (e.g., the file stamp time of the received network flow record 218) is beyond the expiry time ($t_{n+1}+t_A$) for time bucket 206, the time series module would determine that time bucket 206 is complete and time bucket 206 is marked with an "X," as shown in FIG. 2. In one embodiment, a current time being beyond an expiry time means that the current time is later than the expiry time. In another embodiment, a current time being beyond an expiry time means that the current time is later than or equal to the expiry time.

For time bucket 208, the time series module would add the time delay value ($t_A$) to the end time ($t_{n+2}$) of time bucket 208 to calculate an expiry time ($t_{n+2}+t_A$). In the example shown in FIG. 2, if the current time (e.g., the file stamp time of the received network flow record 218) is not beyond the expiry time ($t_{n+2}+t_A$), so the time series module would determine that time bucket 208 is open (e.g., not complete). Similarly, the time series module may determine that time buckets 210 and 212 are open. Because time bucket 206 is complete and time buckets 208, 210, and 212 are open, the time series module considers time buckets 208, 210, and 212 (and time buckets beyond) as time buckets in progress. Accordingly, the time series module would update time buckets 208, 210, and 212, but not time bucket 206, with corresponding flow data in the received network flow record 218.

Figure 3A:
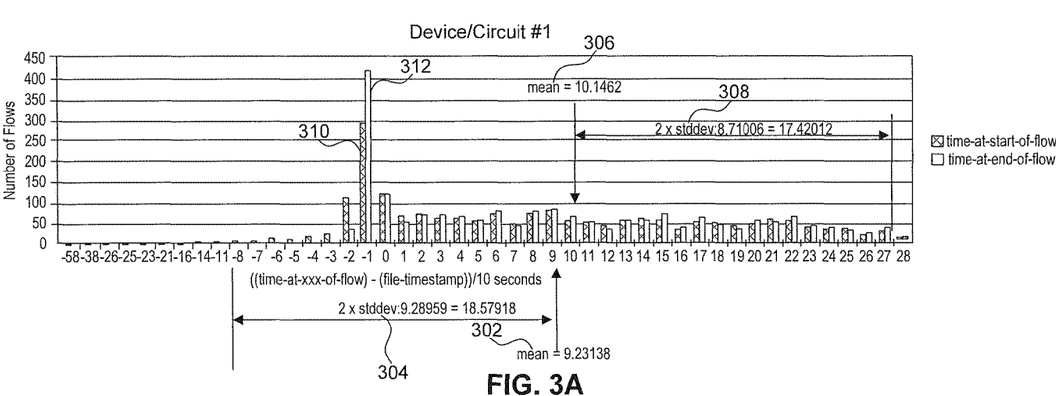
FIG. 3A illustrates an exemplary probability distribution model.
Figure 3B:
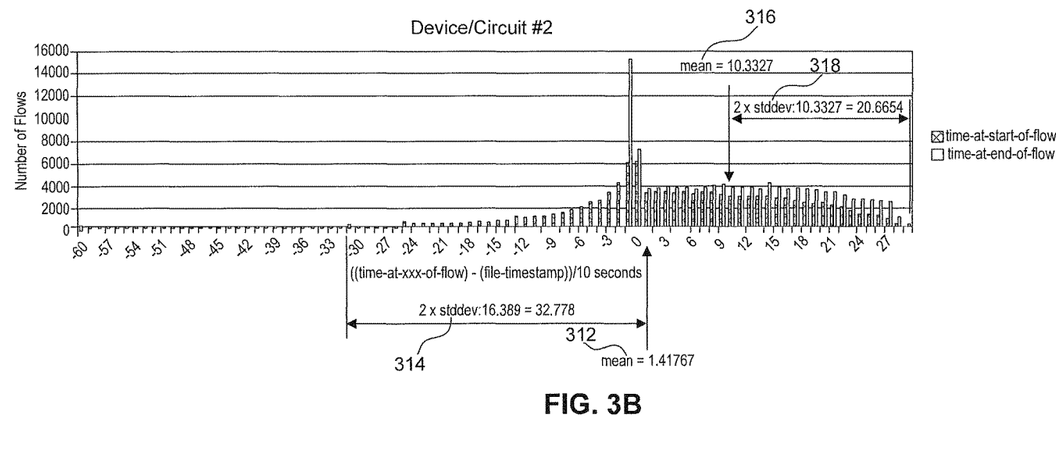
FIG. 3B illustrates another exemplary probability distribution model.

FIGS. 3A and 3B illustrate two exemplary probability distribution models. FIGS. 3A and 3B depict the embodiments where each probability distribution model is associated with a device-circuit pair (i.e., one probability distribution model per device-circuit pair). FIG. 3A shows a probability distribution model associated with device-circuit pair #1. FIG. 3B shows a probability distribution model associated with device-circuit pair #2. In other embodiments not shown in FIGS. 3A and 3B, a probability distribution model may have a different association level. For example, a probability distribution model may be associated with a network device (i.e., one probability distribution model per network device) in one embodiment. In another embodiment, a probability distribution model may be associated with a circuit (i.e., one probability distribution model per circuit).

In FIGS. 3A and 3B, the X-axis of the probability distribution models is the calculated time differences. For illustration simplicity purpose, FIGS. 3A and 3B show the time differences in the unit of seconds divided by 10 (seconds/10). The Y-axis is the flow data. FIGS. 3A and 3B show the exemplary embodiments where the number of flows is used as the flow data for the probability distribution models. In other embodiments, other types of flow data associated with the network flow records may be used as the flow data for the probability distribution models.

FIGS. 3A and 3B show the embodiments where a probability distribution model maintains flow data with respect to both the start times of the flows and the end times of the flows. The darker vertical bars (bars with patterns inside) represent the numbers of flows with respect to the start times of the flows minus the file stamp times. The lighter vertical bars (bars without patterns inside) represent the numbers of flows with respect to the end times of the flows minus the file stamp times. For example, vertical bar 310 represents the number of flows whose time differences with respect to the flow start times (e.g., the flow start times minus the file stamp times of the corresponding network flow records) equal −1. Vertical bar 312 represents the number of flows whose calculated time differences with respect to the flow end times (e.g., the end times minus the file stamp times of the corresponding network flow records) equal −1.

For illustration purpose, assume vertical bar 310 represents 295 flows, which is calculated based on many previous network flow records. When the time series module receives a new network flow record and identifies a flow whose calculated time difference with respect to the flow start time equals −1, the time series module may increment vertical bar 310 by 1 to 296 flows.

After the time series module updates a probability distribution model, the time series module may calculate statistical values (e.g., a mean value and a standard deviation value). For example, in FIG. 3A, mean 302 and standard deviation 304 represent the calculated mean value (9.23138) and the calculated standard deviation value (9.28959) with respect to the flow start times, respectively. Mean 306 and standard deviation 308 represent the calculated mean value (10.1462) and the calculated standard deviation value (8.71006) with respect to the flow end times, respectively. In FIG. 3B, mean 312 and standard deviation 314 represent the calculated mean value (1.41767) and the calculated standard deviation value (16.389) with respect to the flow start times, respectively. Mean 316 and standard deviation 318 represent the calculated mean value (10.3327) and the calculated standard deviation value (10.3327) with respect to the flow end times, respectively.

FIGS. 3A and 3B show that network flow patterns for each device-circuit pair could differ. Accordingly, the time series module may calculate a different time delay value for each device-circuit pair. In one embodiment, a time delay value is calculated based on [2×(standard deviation value)$_{now-start-time}$−(mean value)$_{flow-start-time}$]. For device-circuit pair #1 in FIG. 3A, the time delay value would be calculated based on [2×standard deviation 304−mean 302]. The resulting time delay value would be 9.3478 (2×9.28959−9.23138), which is about 90 seconds (because FIG. 3A displays time in the unit of seconds/10). For device-circuit pair #2 in FIG. 3B, the time delay value would be calculated based on [2×standard deviation 314−mean 312]. The resulting time delay value would be 31.36033 (2×16.389−1.41767), which is about 5 minutes (because FIG. 3B displays time in the unit of seconds/10). In this way, different timeout delay values can address different network flow patterns for each device-circuit pair so that the AD systems can process network flow data more efficiently and more effectively.

Figure 4:
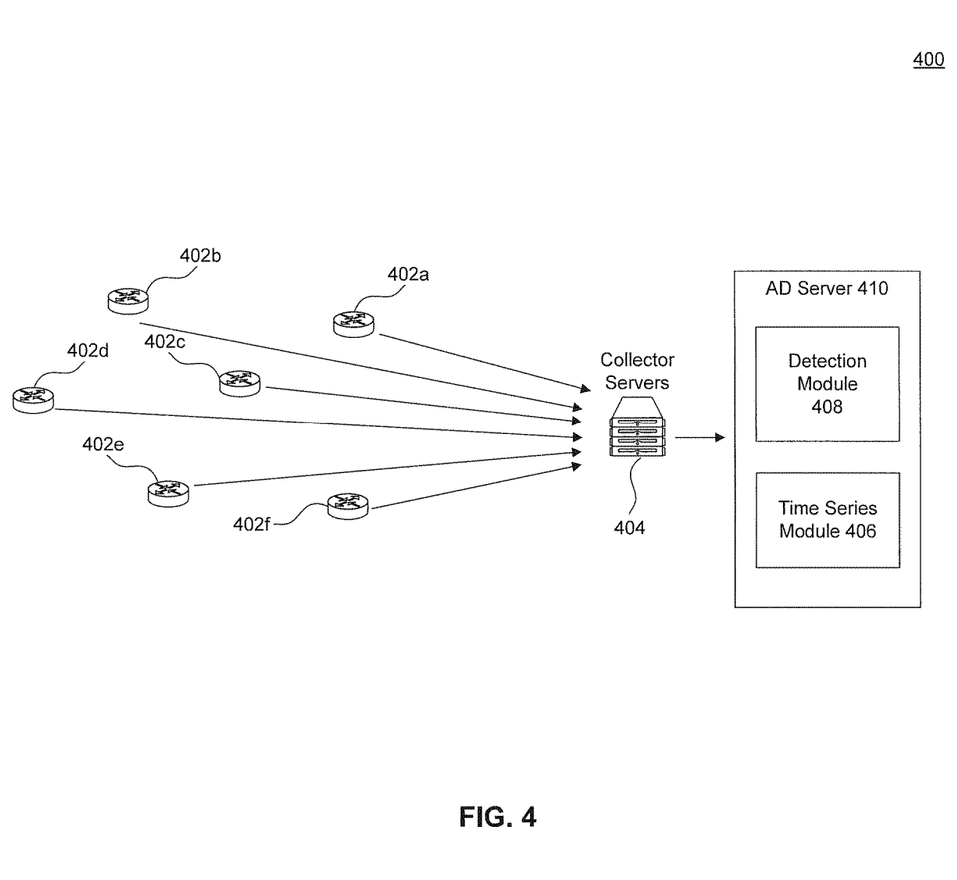
FIG. 4 is a diagram illustrating an example environment 400 for creating aggregate network flow time series for network anomaly detection.

FIG. 4 is a diagram illustrating an example system 400 for creating aggregate network flow time series for network anomaly detection. System 400 includes network devices 402a-402f, one or more collector servers 404, and anomaly detection (AD) server 410. Network devices 402a-402f may be any hardware devices that mediate data in a computer network. Networking devices 402a-402f may be gateways, routers, network bridges, modems, wireless access points, networking cables, line drivers, switches, hubs, and repeaters. Networking devices 402a-402f may also include hybrid network devices such as multilayer switches, protocol converters, bridge routers, proxy servers, firewalls, network address translators, multiplexers, network interface controllers, wireless network interface controllers, ISDN terminal adapters, and other related hardware.

After network devices 402a-402f are configured to enable network flow data collection, network devices 402a-402f may send network flow data (e.g., netflow data) to one or more collector servers 404. One or more collector servers 404 may analyze the network flow data and forward the network flow records (e.g., network flow records) to AD server 410 for network anomaly detection. AD server 410 includes two modules, time series module 406 and detection module 408. Time series module 406 may operate as described above with respect to FIGS. 1, 2, 3A, and 3B. For example, time series module 406 may receive flow data that correspond to a device-circuit pair, calculate a time difference for each flow, update a probability distribution model based on the calculated time differences and the received flow data, and determine whether a time bucket is complete based on the updated probability distribution model. In some embodiment, when time series module 406 determines that a time bucket is complete, time series module 406 sends flow data corresponding to the time bucket to detection module 408 to detect possible network anomalies. For example, based on the flow data corresponding to the time buckets, detection module 408 may determine that the number of network flows are too high for a specific time period, which could indicate that a subscriber has initiated a DOS attack.

FIG. 4 illustrates an embodiment where time series module 406 is a component of AD server 410. In another embodiment, time series module 406 is a component of a separate server located between one or more collector servers 404 and AD server 410. In yet another embodiment, time series module 406 is a component of one of the collector servers 404.

CONCLUSION

Each of the blocks and modules in FIGS. 1 and 4 may be implemented in hardware, software, firmware, or any combination thereof.

Each of the blocks and modules in FIGS. 1 and 4 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

What is claimed is:

1. A computer implemented method for processing network flow data over a time series associated with a device-circuit pair, comprising:
   receiving, by a server, flow data for one or more flows that correspond to the device-circuit pair;
   calculating, by the server, a time difference for each flow of the one or more flows that correspond to the device-circuit pair, wherein calculating the time difference for each flow is based on a start time and an end time of each flow at one of the device-circuit pair and a file stamp time of a network flow record indicating each flow received by the server;
   based on the calculated time differences and the received flow data, updating, by the server, a probability distribution model associated with the device-circuit pair;
   determining, by the server, whether a time bucket, of the time series, is complete or open based on the updated probability distribution model; and
   detecting a network anomaly based on flow data corresponding to the time bucket, in response to determining that the time bucket is complete.

2. The method of claim 1, further comprising:
   in response to determining that the time bucket is complete, ignoring, by the server, additional flow data that corresponds to the time bucket; and
   in response to determining that the time bucket is open, incorporating, by the server, additional flow data that corresponds to the time bucket.

3. The computer implemented method of claim 1, wherein the probability distribution model comprises the received flow data that corresponds to the device-circuit pair and the time differences for the one or more flows that correspond to the device-circuit pair.

4. The computer implemented method of claim 3, wherein the updating the probability distribution model comprises:
   incorporating, by the server, the received flow data and the calculated time differences into the probability distribution model;
   calculating, by the server, a mean value based on the time differences and the flow data included in the probability distribution model; and
   calculating, by the server, a standard deviation value based on the time differences and the flow data included in the probability distribution model.

5. The computer implemented method of claim 4, wherein the determining whether the time bucket is complete or open comprises:
   calculating, by the server, a time delay value based on the standard deviation value; and
   determining, by the server, whether the time bucket is complete or open based on the time delay value and the file stamp time.

6. The computer implemented method of claim 5, wherein the calculating the time delay value comprises calculating the time delay value based on the standard deviation value and the mean value.

7. The computer implemented method of claim 5, wherein the determining whether the time bucket is complete or open comprises:
   creating an expiry time based on an end time of the time bucket and the calculated time delay value;
   determining that the time bucket is complete if the file stamp time is beyond the created expiry time; and
   determining that the time bucket is open if the file stamp time is not beyond the created expiry time.

8. A system for processing network flow data over a time series associated with a device-circuit pair, comprising:
   a memory; and at least one processor coupled to the memory and configured to: receive flow data for one or more flows that correspond to the device-circuit pair;
   calculate a time difference for each flow of the one or more flows that correspond to the device-circuit pair, wherein calculating the time difference for each flow is based on a start time and an end time of each flow at one of the device-circuit pair and a file stamp time of a network flow record indicating each flow received by the server;
   based on the calculated time differences and the received flow data, update a probability distribution model associated with the device-circuit pair;
   determine whether a time bucket, of the time series, is complete or open based on the updated probability distribution model; and
   detect a network anomaly based on flow data corresponding to the time bucket, in response to determining that the time bucket is complete.

9. The system of claim 8, wherein the at least one processor is further configured to:
   in response to determining that the time bucket is complete, ignore additional flow data that corresponds to the time bucket; and
   in response to determining that the time bucket is open, incorporate additional flow data that corresponds to the time bucket.

10. The system of claim 8, wherein the probability distribution model comprises the received flow data that corresponds to the device-circuit pair and the time differences for the one or more flows that correspond to the device-circuit pair.

11. The system of claim 10, wherein the at least one processor is further configured to update the probability distribution model by:
   incorporating the received flow data and the calculated time differences into the probability distribution model;
   calculating a mean value based on the time differences and the flow data included in the probability distribution model; and
   calculating a standard deviation value based on the time differences and the flow data included in the probability distribution model.

12. The system of claim 11, wherein the at least one processor is further configured to determine whether the time bucket is complete or open by:
   calculating a time delay value based on the standard deviation value; and
   determining whether the time bucket is complete or open based on the time delay value and the file stamp time.

13. The system of claim 12, wherein the at least one processor is further configured to calculate the time delay value by calculating the time delay value based on the standard deviation value and the mean value.

14. The system of claim 12, wherein the at least one processor is further configured to determine whether the time bucket is complete or open by:
   creating an expiry time based on an end time of the time bucket and the calculated time delay value;
   determining that the time bucket is complete if the file stamp time is beyond the created expiry time; and
   determining that the time bucket is open if the file stamp time is not beyond the created expiry time.

15. A non-transitory computer-readable medium having instructions stored thereon that, when executed by at least one computing device, causes the at least one computing device to perform operations for processing network flow data over a time series associated with a device-circuit pair, comprising:
   receiving flow data for one or more flows that correspond to the device-circuit pair;
   calculating a time difference for each flow of the one or more flows that correspond to the device-circuit pair, wherein calculating the time difference for each flow is based on a start time and an end time of each flow at one of the device-circuit pair and a file stamp time of a network flow record indicating each flow received by the server;
   based on the calculated time differences and the received flow data, updating a probability distribution model associated with the device-circuit pair;
   determining whether a time bucket, of the time series, is complete or open based on the updated probability distribution model; and
   detecting a network anomaly based on flow data corresponding to the time bucket, in response to determining that the time bucket is complete.

16. The non-transitory computer-readable medium of claim 15, wherein the operations further comprise:
   in response to determining that the time bucket is complete, ignoring additional flow data that corresponds to the time bucket; and
   in response to determining that the time bucket is open, incorporating additional flow data that corresponds to the time bucket.

\* \* \* \* \*